(12) United States Patent
Arenas et al.

(10) Patent No.: US 9,710,496 B2
(45) Date of Patent: Jul. 18, 2017

(54) DETERMINING THE SCHEMA OF A GRAPH DATASET

(71) Applicant: International Business Machines Corporation, Armonk, NY (US)

(72) Inventors: Marcelo Arenas, Providencia (CL); Gonzalo Diaz, Oxford (GB); Achille Fokoue, White Plains, NY (US); Anastasios Kementsietsidis, New York, NY (US); Kavitha Srinivas, Rye, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 713 days.

(21) Appl. No.: 14/151,768

(22) Filed: Jan. 9, 2014

(65) Prior Publication Data

US 2015/0193478 A1    Jul. 9, 2015

(51) Int. Cl.
*G06F 7/00*     (2006.01)
*G06F 17/30*    (2006.01)

(52) U.S. Cl.
CPC .. *G06F 17/30292* (2013.01); *G06F 17/30595* (2013.01)

(58) Field of Classification Search
CPC ................................................. G06F 17/30292
See application file for complete search history.

(56) References Cited

U.S. PATENT DOCUMENTS

| | | |
|---|---|---|
| 7,418,461 B2 | 8/2008 | Tamma et al. |
| 7,596,748 B2 | 9/2009 | Raghavachari et al. |
| 7,921,358 B2 | 4/2011 | Slone et al. |
| 8,166,257 B1 | 4/2012 | Holl, II et al. |
| 8,239,820 B1 | 8/2012 | White et al. |
| 8,255,427 B2 | 8/2012 | Huch |
| 8,321,867 B1 | 11/2012 | Holl, II et al. |
| 8,329,820 B2 | 12/2012 | Hu et al. |
| 9,098,566 B2 * | 8/2015 | Srinivasan ........ G06F 17/30604 |
| 9,104,707 B1 * | 8/2015 | Allen ................ G06F 17/30292 |
| 9,323,864 B2 * | 4/2016 | Bornea ............. G06F 17/30292 |

(Continued)

OTHER PUBLICATIONS

Lee et al., Automating Relational Database Schema Design for Very Large Sematic Datasets, published Mar. 29, 2013.*

(Continued)

*Primary Examiner* — Jeffrey A Burke
(74) *Attorney, Agent, or Firm* — Patent Portfolio Builders PLLC

(57) ABSTRACT

A schema for a dataset is identified by identifying a dataset comprising data and relationships between data pairs. An original schema is identified for the dataset. This original schema comprises an organizational structure. An initial fit between the dataset and the original schema is determined. The initial fit quantifying a conformity of the data in the dataset to the organizational structure of the original schema. A plurality of additional schemas are identified. Each additional schema is a distinct organizational schema. The dataset is partitioned into a plurality of subsets. Each subset comprises a modified fit quantifying a modified conformity of subset data in each subset to one of the original schema and the additional schemas. The modified fit is greater than the original fit.

33 Claims, 2 Drawing Sheets

(56) References Cited

U.S. PATENT DOCUMENTS

| | | | |
|---|---|---|---|
| 2004/0167904 A1* | 8/2004 | Wen | G06F 17/30914 |
| 2004/0210552 A1* | 10/2004 | Friedman | G06F 17/30864 |
| 2005/0120029 A1* | 6/2005 | Tomic | G06F 17/30917 |
| 2005/0278139 A1* | 12/2005 | Glaenzer | G06F 17/2211 |
| | | | 702/179 |
| 2006/0271506 A1* | 11/2006 | Bohannon | G06F 17/3092 |
| 2007/0055655 A1* | 3/2007 | Bernstein | G06F 17/30292 |
| 2009/0037769 A1* | 2/2009 | Babkin | G06F 17/30516 |
| | | | 714/15 |
| 2010/0205212 A1 | 8/2010 | Quadracci et al. | |
| 2012/0078913 A1* | 3/2012 | Muni | G06F 17/30292 |
| | | | 707/740 |
| 2012/0095892 A1 | 4/2012 | Kagarlis et al. | |
| 2013/0007070 A1 | 1/2013 | Pitschke | |
| 2013/0144893 A1* | 6/2013 | Voigt | G06F 17/30557 |
| | | | 707/754 |
| 2014/0214857 A1* | 7/2014 | Srinivasan | G06F 17/30908 |
| | | | 707/748 |

OTHER PUBLICATIONS

Thomas Lee et al., Automating Relational Database Schema Design for Very large Semantic Datasets, Department of Computer Science, The University of Hong Kong, Published Mar. 29, 2013.*

Marcelo Arenas et al., A Principled Approach to Bridging the Gap Between Graph Data and their Semantics, Proceedings of the VLDB Endowment, vol. 7, No. 8, published 2014.*

Gonzalo Caceres, A Prinicpled Approach to Bridging the Gap Between RDF Data and Their Schemas, Masters Thesis, Published Sep. 2013.*

Songyun Duan et al., Apples and Oranges: A Comparison of RDF Benchmarks and Real RDF Datasets, SIGMOD'11, Published Jun. 2011.*

Hogan et al.; "An Empirical Survey of Linked Data Conformance", Web Semantics: Science, Services and Agents on the World Wide Web 14(2012) 14-44, Apr. 2, 2012, pp. 14-44.

Kopel et. al.; "The Consistency and Conformance of Web Document Collection Based on Heterogeneous DAC Graph", IEA/AIE 2008, LNAI vol. 5027, 2008, pp. 321-330.

* cited by examiner

DETERMINING THE SCHEMA OF A GRAPH DATASET

FIELD OF THE INVENTION

The present invention relates to data management.

BACKGROUND OF THE INVENTION

Graph and document datasets, e.g., resource description framework (RDF) and JavaScript Object Notation (JSON), are commonly used and widespread. One of the advantages of the corresponding models that led to the proliferation of such data is the schema flexibility associated with JSON or RDF data. For example, users of an RDF dataset can add new predicates to a particular entity without concern for "breaking or violating the schema", and different instances of the same type might have completely different predicates. Although this provides great flexibility and value in a number of situations, e.g., during the exchange or integration of multiple datasets, knowledge of the actual schema to which the underlying data conform is desired for purposes of data analysis, data understanding, data query and data storage.

The challenge is in finding the appropriate schema and ensuring conformance with this appropriate schema for all the data contained within a given dataset. Studies have shown that even if semi-structure datasets come with a schema, there is seldom any relationship between what the schema claims about the structure of the data and the actual structure of the data. Although the existing schema can be used as a guide, further work is required to identify the actual schema, i.e., structure or organization, of a given dataset associated with that existing schema. Identifying the actual schema of the data provides for better querying and storage of the data as well as better understanding of the data for purposes of data analytics.

This mis-match between a given schema and data that conform to the given schema exists for various types of datasets including RDF graphs. A prominent example of this is DBpedia, which is RDF data extracted from Wikipedia, a publicly editable source of information. One example is the popular sort of DBpedia persons, which includes all the people having an entry in Wikipedia. According to the sort definition, each person in DBpedia has 8 properties—a name, a given Name, a surName, a birth Date, a birth Place, a death Date, a death Place, and a description. There are currently 790,703 people, and while a large portion of them are likely alive, i.e., they do not have a death date or death place, data exist regarding when and where these people were born. The statistics for these people, however, are very revealing. Only 420,242 people have a birthdate and only 323,368 have a birthplace. For only 241,156 are both the birthdate and the birthplace known. There are approximately 40,000 people that do not even have an associated last name. When it comes to death places and death dates, these data re know for only 90,246 and 173,507 people, respectively.

There is actually nothing wrong with the DBpedia person data. The data reflect the simple fact that the available information about any domain of discourse, e.g., people, is inherently incomplete. While this is the nature of information practice, data sorts go against this trend and favor uniformity, i.e., sorts require that the data tightly conform to the provided sorts. In the example of DBpedia person, the expectation is to have all 8 properties for every DBpedia person. Therefore, there is a need to bridge the gap between these two worlds, the sorts and the respective data.

SUMMARY OF THE INVENTION

Exemplary embodiments of systems and methods in accordance with the present invention provide a framework for specifying structuredness functions, which gauge the degree to which a dataset such as an RDF graph conforms to a given schema. In particular, a formal language is defined for specifying structuredness functions with expressions called rules. This language allows a user or a database administrator to state a rule to which an RDF graph may fully or partially conform. Then, the issue of discovering a refinement of a sort is addressed by partitioning the dataset into subsets whose structuredness is over a specified threshold. In particular, the natural decision problem associated to this refinement problem is NP-complete and a natural translation of this problem into Integer Linear Programming (ILP) is provided.

In accordance with one exemplary embodiment, the data are analyzed, and an identification is made regarding the entities that exist in the data, the types associated with these entities and the properties associated with each entity. For each data entity, appropriate bitmaps are constructed to encode this information, and these bitmaps are used for processing the underlying data instead of using the actual underlying raw data. This reduces the amount of memory and CPU usage required in subsequent analysis of the data. Given the bitmaps and a possibly pre-existing type system, the data are analyzed to determine how well the data fit into this pre-existing type system. For the DBpedia person type, it was determined that although all instances of person are similar in terms of their properties, there are actually 64 different sub-types/sub-categories of person bundled into this single type. The user is informed regarding these 64 types, and input is solicited regarding how to proceed.

The user provides a metric written as a formula in a given language along with a threshold that describes what the user considers a satisfactory conformance of instances to types. Furthermore, the user provides a desired number of new types to generate in the revised type system or identifies the minimal number of desired types that conform to the identified requirements as specified by the previously mentioned metric and threshold. In the DBpedia example, the user provides a number, for example 10, to indicate that from the 64 sub-types of person, a new type system is desired that contains only 10 types. The optimal type system is computed that satisfies all the user requirements. In general, this is a rather difficult problem, and in terms of complexity, the problem is in NP. Investigating all possible solutions and all possible combinations of types to satisfy the two user input constraints is challenging. Therefore, the problem is formulized as an ILP program run using, for example, CPLEX. The result is a type system that conforms to the input and has a clear and understandable semantics. In an alternative embodiment, the user only provides one of the inputs, for example, the number of types, and the best threshold of conformance is determined that can be computed given the number of types restrictions. If the user only provides the threshold, the least number of types is determined that satisfy the threshold.

DETAILED DESCRIPTION

Figure 1:
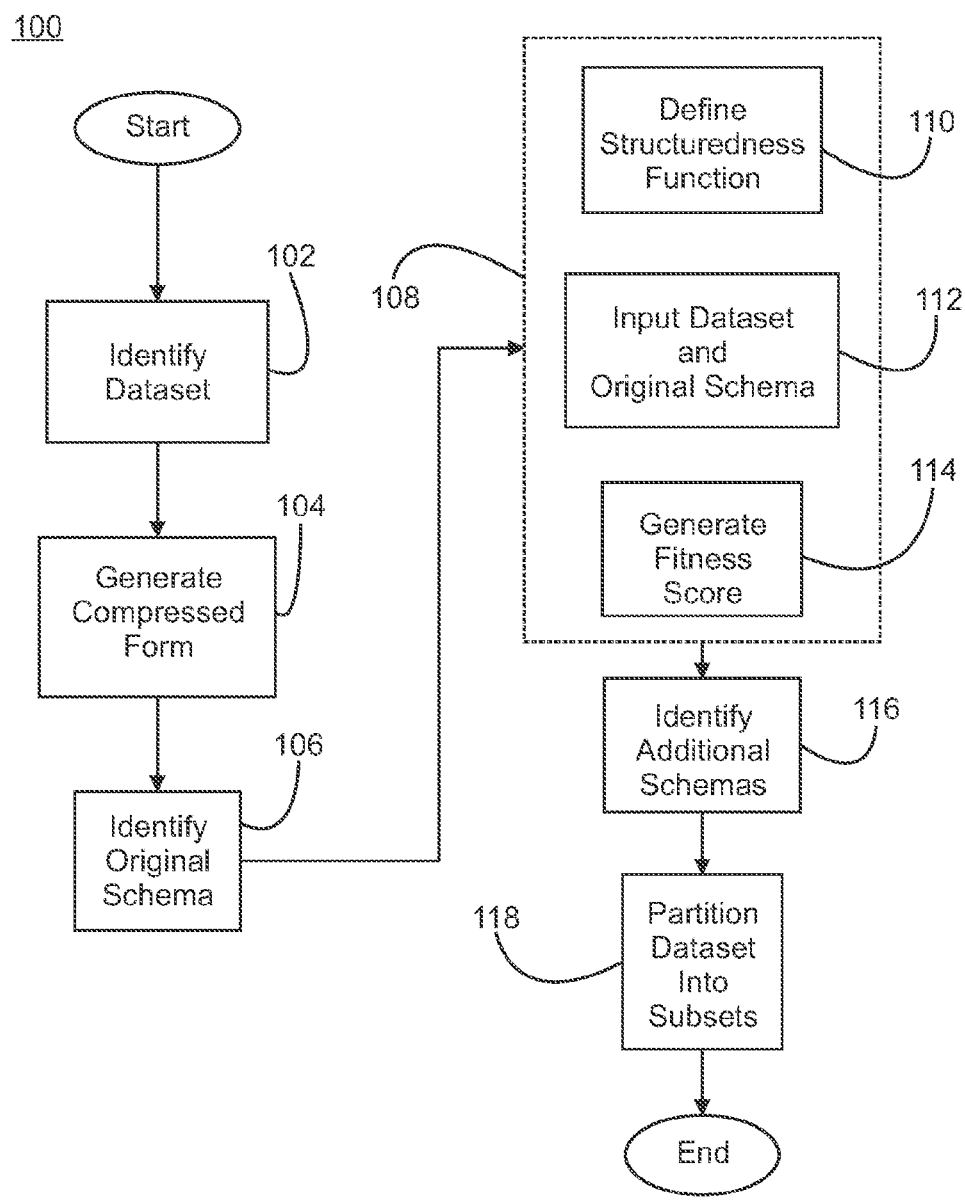
FIG. 1 is a flow chart illustrating an embodiment of a method for method for determining a schema for a dataset in accordance with the present invention.

Exemplary embodiments in accordance with the present invention are direct to a method for determining a schema for a dataset. Suitable datasets include, but are not limited to, graph datasets. For example, the dataset can be a resource description framework (RDF) dataset containing a plurality of subjects and a plurality of objects that make up the dataset data. A plurality of predicates are also included that are the dataset relationships expressing the relationships between subject and object pairs.

In one embodiment, two countably infinite disjoint sets U of uniform resource identifiers (URIs) and L of literals are assumed. An RDF triple is a tuple $(s, p, o) \in U \times U \times (U \cup L)$, and an RDF graph is a finite set of RDF triples. Given an RDF graph D, the sets of subjects and properties mentioned in D, respectively denoted by S(D) and P(D), are defined as:

$$S(D) = \{s \in U | \exists p \exists o \; s \cdot t \cdot (s,p,o) \in D\},$$

$$P(D) = \{p \in U | \exists s \exists o \; s \cdot t \cdot (s,p,o) \in D\}$$

Given an RDF graph D and s, $p \in U$, s has property p in D if there exists $o \in U$ such that $(s, p, o) \in D$.

The data in the database can be stored in various formats such as graphs, matrices and tables. For tables and matrices, rows and columns intersect in cells. In one embodiment, the labels on the rows and columns are indices and represent the subjects and properties of the database data, i.e., each index corresponds to a given subject or given property. In one embodiment, the rows correspond to subjects, and the columns correspond to the properties. The intersection of rows and columns are the cells in the table or matrix. These cells contain data values, i.e., the values of a given property for a given subject. For purposes of determining schema compliance, the actual data value is not used; however, the existence of the data value for a given subject and property pair is used. Therefore, a binary indicator is substituted into the data cells. For example, a value of one is placed in cells having a data value, and a value of zero is placed in cells without a data value.

A natural way of storing RDF data in a relational table, known as the horizontal database, defines only one relational table in which each row represents a subject and there is a column for every property. With this in mind, given an RDF graph D, an $|S(D)| \times |P(D)|$ matrix M(D) (or just M if D is clear from the context) is defined as follows: for every $s \in S(D)$ and $p \in P(D)$, $$M(D)_{sp} = \begin{cases} 1 & \text{if } s \text{ has property } p \text{ in } D \\ 0 & \text{otherwise} \end{cases}.$$

In an RDF graph, to indicate that a subject s is of a specific sort t (like person or country), the following triple is present—(s, type, t), where the constant type=http://www.w3.org/1999/02/22-rdf-syntax-ns#type (note that type $\in U$).

Given a URI t, the following RDF subgraph $D_t \subseteq D: D_t = \{(s, p, o) \in D | (s, \text{type}, t) \in D\}$ is defined. This subgraph contains all triples whose subject s is explicitly declared to be of sort t in D. With this subgraph $D_t$, its set of subjects can be mentioned, $S(D_t)$, which is also the set of subjects of sort t in D, and its set of properties $P(D_t)$, which is the set of properties set by some subject of sort t. The term sort can be used to refer to the constant t, the RDF subgraph $D_t$, and sometimes the set $S(D_t)$.

Referring to FIG. 1, an embodiment of a method for determining a schema for a database 100 is illustrated. Initially, a dataset containing data and relationships between data pairs is identified 102. In order to facilitate the dataset evaluation and creation of a schema, a compressed form of the dataset can be created 104. In addition to the dataset, an original schema for the dataset is identified 106. The original schema is a description of an organizational structure of the data within a dataset. The database is then evaluated to determine an initial fit between the dataset and the original schema 108. This initial fit quantifies a conformity of the data in the dataset to the organizational structure of the original schema.

As there are many alternative ways to define the fitness, or structuredness, of a dataset with respect to a schema, it is convenient to define structuredness initially in the most general way. A structuredness function $\sigma$ is a function that assigns to every dataset, e.g., RDF graph D, a fitness score that is a rational number $\sigma(D)$, such that $0 \leq \sigma(D) \leq 1$. Within the context of this framework, a structuredness function produces rational numbers.

Therefore, in order to determine the fitness of a given database to an initial schema, a structuredness function is defined 110. Various types of structuredness functions can be used. These can be selected based on the underlying structure, e.g., the uniformity of the database.

In one embodiment, a COVERAGE function $\sigma_{Cov}$ is defined to test the fitness of the dataset, i.e., the graph data, to the a given schema. The metric is used to illustrate that though graph benchmark data are very relational-like and have high fitness (values of $\sigma_{Cov}(D)$ close to 1) with respect to their sort, real graph data are fairly unstructured and have low fitness ($\sigma_{Cov}(D)$ less than 0.5). Using the compressed data representation, this coverage metric is expressed as follows: $\sigma_{Cov}(D) = (\Sigma_{sp} M(D)_{sp})/|S(D)||P(D)|$. Intuitively, the metric favors conformity, i.e., if one subject has a property p, then the other subjects of the same sort are expected to also have this property. In one embodiment, the structuredness function is defined to evaluate the dataset for a data structure where if one subject has a given associated property, e.g., a cell value of 1, then all subjects in the dataset have this given associated property. The fitness score is then generated to express an extent to which data in the dataset conform to this dataset structure.

Therefore, the metric is not forgiving when it comes to missing properties. To illustrate, consider an RDF graph $D_1$ containing N triples: $(s_i, p, o)$ for $i=1, \ldots, N$, i.e., all N subjects have the same property p. The matrix is $M(D_1)$ for $D_1$. For this dataset, $\sigma_{Cov}(D_1) = 1$. Assume a new triple $(s_1, q, o)$ is inserted for some property $q \neq p$, resulting dataset $D_2 = D_1 \cup \{(s_1, q, o)\}$ having a different matrix. Then, the structuredness of $\sigma_{Cov}(D_2) \approx 0.5$ (for large N). This is because the addition of the single triple generates a new dataset $D_2$ in which most of the existing subjects are missing property q, an indication of unstructureness.

This behavior motivates the introduction of a structuredness function that is less sensitive to missing properties. In one embodiment, the structuredness function is defined to evaluate a data structure within the dataset when if a first subject has a given associated property then a second subject also has the given associated property. This structuredness function is used to generate a fitness score that expresses a probability that data in the dataset conform to this dataset structure. This is a similarity structuredness that is defined by the $\sigma_{Sim}$ structuredness function as the probability that, given two randomly selected subjects s and s' and a random property p such that s has property p in D, s' also has property p in D.

To define the function formally, let $\phi_1^{Sim}(s, s', p)$ denote the statement "s≠s' and s has property p in D" and $\phi_2^{Sim}(s', p)$ denote "s' has property p in D". Next, a set of total cases is defined as $total(\phi_1^{Sim},D)=\{(s,s',p)\in S(D)\times S(D)\times P(D) | \phi_1^{Sim} holds\}$, and a set of favorable cases is defined as $total(\phi_1^{Sim} \wedge \phi_2^{Sim},D)=\{(s,s',p)\in S(D)\times S(D)\times P(D) | \phi_1^{Sim} \wedge \phi_2^{Sim} holds\}$. It is noted that $total(\phi_1^{Sim} \wedge \phi_2^{Sim}, D) \subseteq total(\phi_1^{Sim},D)$. This facilitates the incorporation of similarity in the structuredness function as:

$$\sigma_{Sim}(D) = \frac{|total(\varphi_1^{Sim} \wedge \varphi_2^{Sim}, D)|}{|total(\varphi_1^{Sim}, D)|}.$$

Returning to the example, it is noted that $\sigma_{Sim}(D_1)=1$ and that $\sigma_{Sim}(D_2)$ is still approximately equal to 1 (for large N). Unlike $\sigma_{Cov}$, the function $\sigma_{Sim}$ allows certain subjects to have exotic properties that either no other subject has or only a small fraction of other subjects have, while maintaining high values for $\sigma_{Sim}$. As another example, consider the RDF graph $D_3$ where every subject $s_i$ has only one property $p_i$, and no two subjects have the same property. This dataset is intuitively very unstructured. Indeed, $\sigma_{Sim}(D_3)=0$ while $\sigma_{Cov}(D_3) \approx 0$ (for a large value of N).

In one embodiment, the structuredness function is defined to evaluate a dataset structure where if one subject has a first associated property it also has a second associated property. The structuredness function generates the fitness score to express an extent to which the data in the dataset conform to this dataset structure. This structuredness function expresses the correlation between different properties in an RDF graph D, i.e., dependency. By letting $p_1, p_2 \in P(D)$ be two fixed properties of interest, a dependency function $\sigma_{Dep}[p_1, p_2]$ is defined as the probability that, given a random subject $s \in S(D)$ such that s has $p_1$, s also has $p_2$.

Again, a set of total cases and a set of favorable cases can be defined, and the value of $\sigma_{Dep}[p_1, p_2]$ is defined as the ratio of the sizes of both sets. A closely related structuredness function is the symmetric version $\sigma_{Dep}[p_1, p_2]$, called $\sigma_{SymDep}[p_1, p_2]$. This symmetric version is defined as the probability that, given a random subject $s \in S(D)$ such that s has $p_1$ or s has $p_2$, s has both.

As was illustrated above, some intuitive structuredness measures give very different results when applied to the same RDF graphs. As many more natural structuredness functions exist, a general framework is used to define custom structuredness measures in a simple way. In order to facilitate this general framework, a language for describing these custom structuredness measures is used that has a simple syntax and a formal semantics. This language is expressive enough to represent many natural structuredness functions. In general, starting from the matrix M(D) of a dataset D, the language constructs statements that involve the contents of the matrix, i.e., the cells of the matrix with 0 or 1 values, the indices of the matrix that correspond to the subjects and properties of the dataset and combinations of these basic building components in the form of conjunctions, disjunctions and negations.

To define the syntax of the language, V is defined as an infinite set of variables disjoint from U. The variables in V are denoted as $c_1, c_2, c_3 \ldots$, as each one of these variables is used as a pointer to a cell (or position) in a matrix associated with an RDF graph. Moreover, it is assumed that 0,1 do not belong to $(U \cup V)$. Then the set of terms in the language is defined as follows:

0, 1, every $u \in U$ and every $c \in V$ is a term, and
if $c \in V$, then val(c), subj(c) and prop(c) are terms.

If c is a variable pointing to a particular cell in a matrix, then val(c) represents the value of the cell, which is either 0 or 1, subj(c) denotes the row of the cell, which is the subject of a triple in D, and prop(c) denotes the column of the cell, which is the property of a triple in D. Moreover, the set of formulas in the language is recursively defined as follows:

If $c \in V$ and $\in U$, then val(c)=0, val(c)=1, prop(c)=u and subj(c)=u are formulas.
If $c_1, c_2 \in V$, then $c_1=c_2$, val($c_1$)=val($c_2$), prop($c_1$)=prop($c_2$) and subj($c_1$)=subj($c_2$) are formulas.
If $\phi_1$ and $\phi_2$ are formulas, then $(\neg \phi_1)$, $(\phi_1 \wedge \phi_2)$, $(\phi_1 \vee \phi_2)$ are formulas.

If $\phi$ is a formula, then var($\phi$) is the set consisting of all the variables mentioned in $\phi$. Using this notation, the syntax of the rules in the language is defined, and the rules are used to define structuredness functions. Formally, if $\phi_1, \phi_2$ are formulas such that var($\phi_2$)⊆var($\phi_1$), then the following is a rule:

$$\phi_1 \mapsto \phi_2. \quad (1)$$

To define how rules of the form of equation (1) are evaluated, the notion of satisfaction of a formula is defined. It is assumed that D is an RDF graph and that M is the $|S(D)| \times |P(D)|$ matrix associated with D. A partial function $\rho: V \rightarrow S(D) \times P(D)$ is said to be a variable assignment for M, whose domain is denoted by dom($\rho$). Moreover, given a formula $\phi$ and a variable assignment $\rho$ for M such that var($\phi$)⊆dom($\rho$), pair (M,$\rho$) is said to satisfy $\phi$, denoted by (M,$\rho$)⊨ $\phi$, if:

1. $\phi$ is the formula val(c)=i, where i=0 or i=1, $\rho$(c)=(s,p) and $M_{sp}$=i.
2. $\phi$ is the formula subj=u, where u∈U and $\rho$(c)=(u,p).
3. $\phi$ is the formula prop(c)=u, where u∈U, and $\rho$(c)=(s,u).
4. $\phi$ is the formula $c_1=c_2$, and $\rho(c_1)=\rho(c_2)$.
5. $\phi$ is the formula val($c_1$)=val($c_2$), $\rho(c_1)=(s_1,p_1)$, $\rho(c_2)=(s_2,p_2)$ and $M_{s_1 p_1}=M_{s_2 p_2}$.
6. $\phi$ is the formula subj($c_1$)=subj($c_2$), $\rho(c_1)=(s_1,p_1)$, $\rho(c_2)=(s_2,p_2)$ and $s_1=s_2$.
7. $\phi$ is the formula prop($c_1$)=prop($c_2$), $\rho(c_1)=(s_1,p_1)$, $\rho(c_2)=(s_2,p_2)$ and $p_1=p_2$.
8. $\phi$ is the formula $(\neg \phi_1)$ and (M,$\rho$)⊨ $\phi_1$ does not hold.
9. $\phi$ is the formula $(\phi_1 \wedge \phi_2)$, (M,$\rho$)⊨ $\phi_1$ and (M,$\rho$)⊨ $\phi_2$.
10. $\phi$ is the formula $(\phi_1 \vee \phi_2)$, and (M,$\rho$)⊨ $\phi_1$ or (M,$\rho$)⊨ $\phi_2$.

Moreover, the set of satisfying assignments for a formula $\phi$ w.r.t. M, denoted by total($\phi$, M), is defined as follows:

{$\rho | \rho$ is a variable assignment for ƒM such that dom($\rho$)=var($\phi$) and (M,$\rho$)⊨ $\phi$}

In order to define the semantics of rules, it is assumed that r is the rule of equation (1). Then the structuredness function given by rule r is defined as a function $\sigma_r$ that assigns to every matrix M the value $$\sigma_r(M) = \frac{|total(\varphi_1 \wedge \varphi_2, M)|}{|total(\varphi_1, M)|} \text{ if } |total(\varphi_1, M)| > 0,$$

and 1 otherwise. It is noted that $0 \leq \sigma_r(M) \leq 1$ and assumed that var($\phi_2$)⊆var($\phi_1$). Thus, $\sigma_r(M)$ is defined as the probability that a variable assignment $\rho$ satisfies $\phi_2$ given that $\rho$ satisfies $\phi_1$.

Going back to the exemplary structuredness functions presented above these can be expressed as follows: The $\sigma_{Cov}$ structuredness measure can be expressed with the rule $c=c \mapsto val(c)=1$.

In this case, given a matrix M, total(c=c, M) is the set of all cells of M and total(c=c∧ val(c)=1, M) is the set of all cells of M containing a value 1, which is represented by the condition val(c)=1. In some cases, it is desirable to compute a structuredness functions without considering some predicate or set of predicates, which can be easily done in our language. For instance, a modified $\sigma_{Cov}$ structuredness measure which ignores a specific column called $p$ is defined by the following rule: $c=c \wedge \neg (prop(c)=p) \mapsto val(c)=1$.

The $\sigma_{Sim}$ structuredness measure can be expressed with the rule $\neg (c_1=c_2) \wedge prop(c_1)=prop(c_2) \wedge val(c_1)=1 \mapsto val(c_2)=1$; where $\neg (c_1=c_2)$ considers two variables $c_1$ and $c_2$ that should point to different cells, and $prop(c_1)=prop(c_2)$ requires that the two variables range over the same property column, say property p. Taken together, the first two formulas iterate over all pairs of subjects for each property p. The last part of the formula val($c_1$)=1 requires that the value of the first cell be 1, i.e., the first subject actually has property p. If the consequence formula is satisfied, then the rule considers the cases where the second cell is also, which translates to the second subject also having property p. Notice that this is exactly the definition of the function $\sigma_{Sim}$.

For fixed $p_1$, $p_2 \in U$, the dependency measures are also expressed. The $\sigma_{Dep}[p_1, p_2]$ structuredness measure can be expressed with the rule $subj(c_1)=subj(c_2) \wedge prop(c_1)=p_1 \wedge prop(c_2)=p_2 \wedge val(c_1)=1 \mapsto val(c_2)=1$. While the $\sigma_{SymDep}[p_1, p_2]$ structuredness measure can be expressed with the rule $subj(c_1)=subj(c_2) \wedge prop(c_1)=p_1 \wedge prop(c_2)=p_2 \wedge (val(c_1)=1 \vee val(c_2)=1) \mapsto val(c_1)=1 \wedge val(c_2)=1$.

This language is used to define a structuredness measure for a dataset. If the value of the measure for the dataset is high, say 0.9 or even 1.0, then this is probably a positive indication for the current state of the data, and the measure computation can be repeated at a later stage, as the data change. If this value is relatively low, 0.5 or 0.1, the dataset does not have the desired characteristic, as expressed by the measure. Therefore, systems and methods in accordance with the present invention convert the existing dataset into one having a higher measure. The existing data are left as they are, and the sort to which the data is supposed to fit is modified to improve structuredness.

In order to facilitate the creation of the new sort, i.e., the creation of subsets from the original dataset, a plurality of additional schemas are identified 116. Each additional schema is a distinct organizational schema. The additional schemas and the original schema are available for use in evaluating the conformance of any dataset or subset, e.g., sort. The dataset is partitioned into a plurality of subsets 118. Each subset has a modified fit quantifying a modified conformity of subset data in each subset to a given schema that can be the original schema or one of the additional schemas. The modified fit is greater than the original fit. Therefore, schema conformity is increased. Each subset can be evaluated against the same schema, or one or more subsets is evaluated against a separate schema. While the subsets can overlap, preferably, the intersection of the plurality of subsets is an empty set and the union of the plurality of subsets is the original dataset.

In one embodiment, the dataset is partitioned by defining a structuredness function that generates a fitness score for the modified fit of a subset. This structuredness function can be any one of the structuredness functions described herein and can be expressed using rules in the language described herein. A threshold value for the fitness score is defined, and a smallest number of subsets in the plurality of subsets are determined such that each subset has a fitness score greater than the threshold value. In another embodiment, a pre-determined number of subsets to be included in the plurality of subsets are determined, and the plurality of subsets having the pre-determined number of subsets are selected such that a minimum fitness score across all subsets in the plurality of subsets is a maximum fitness score among all potential groupings of subsets of the dataset comprising the pre-determined number of subsets.

In one embodiment, a given dataset is partitioned into k implicit sorts, i.e., divided into the plurality of subsets, such that each implicit sort has a high structuredness as defined by the rules described above. For a certain subject $s_0 \in S(D)$, all triples of the form $(s_0, p, o)$ are kept together for some p, $o \in U$. These triples are referred to collectively as the entity $s_0$.

An entity preserving partition of size k of an RDF graph D is defined to be a set of non-empty RDF graphs $\{D_1, \ldots, D_k\}$ where $D_i \subseteq D$ for every $i \in \{1, \ldots, k\}$, $D_i \cap D_j = \emptyset$ for every $i, j \in \{1, \ldots, k\}$ such that $i \neq j$, $\cup_{i=1}^{k} D_i = D$, and for all s, $p_1$, $p_2$, $o_1$, $o_2 \in U$. Therefore, if $(s, p_1, o_1) \in D_i$ and $(s, p_2, o_2) \in D_j$, then $i=j$.

While the first three items specify a partition of D, the last item indicates that for every entity s, the full entity is included in a sort. A second consideration concerns the grouping of subjects which have the same properties in D. For this, the concept of signature is defined. Given a dataset such as an RDF graph D and a subject $s \in S(D)$, the signature of s in D is a function $sig(s,D):P(D) \to \{0,1\}$ that assigns to every property $p \in P(D)$ a 1 if s has property p in D, and a 0 otherwise. Letting D be a fixed RDF graph and $\theta$ be a rational number such that $0 \le \theta \le 1$, the threshold a rational number and given a structuredness function $\sigma$, a $\sigma$-sort refinement T of D with threshold $\theta$ is an entity preserving partition $\{D_1, \ldots, D_n\}$ of D such that $\sigma(D_i) \ge \theta$ for $i=1, \ldots, n$ and ii) each $D_i (1 \le i \le n)$ is closed under signatures. That is, for every pair of subjects $s_1$, $s_2 \in S(D)$, if $sig(s_1, D)=sig(s_2, D)$ and $s_1 \in S(D_i)$, then $s_2 \in S(D_i)$.

As used herein, the elements of the sort refinement, i.e., the elements of the partition of D, are referred to as implicit sorts, and systems and methods in accordance with the present invention discover sort refinements in datasets such as RDF data. The term signature refers to the binary function described above in the signature definition and to the set of all entities in an RDF graph D that share a common signature. In this second case, the size of a signature is the number of entities (or subjects) sharing that signature. A visual representation of an RDF graph can be provided using a horizontal table. Every column in the table represents a given property, and the rows are grouped by signature in descending order of signature size. The rows can been delimited with a dashed line, for clarity. The subsequent signatures are visually separated by searching for the change in pattern. The columns and rows yield a plurality of cells that are filled in accordance with the existence of values. For example, the cell can be filled with a color such as black, and the black zones represent data, i.e. non-null values. Cells filled with a color such as white yield white regions that represent null cells. The resulting patterns of black and white regions provide visual indication of the structure and uniformity of the dataset that is immediately visible. The values of the structuredness functions show how they differ in judging the structuredness of an RDF graph. A sort refinement corresponds to a partitioning of the rows of the horizontal table into subtables. In all figures for a given dataset, the same number of columns can be depicted for easy comparison, even if some columns are not present in a given subset of the sort refinement.

In order to define the decision problem, a rule r is fixed. Sort refinements for a given dataset are then determined given the fixed rule. The input is a data set such as an RDF graph D, a rational number θ such that 0≤θ≤1 and a positive integer k. A decision is then made regarding whether there exists an $\sigma_r$-sort refinement T of D with threshold θ that contains at most k implicit sorts.

This determination of the existence of the desired sort refinement is in NP for every rule r. For a rule $r_0$ this determination is NP-hard. This result holds even if k=3 and θ=1. Stating that the determination of the existence of the desired sort refinement is in NP is a corollary of the fact that one can efficiently check if a sort refinement is an entity preserving partition of an RDF graph and has the correct threshold, as for every (fixed) rule r, the function $\sigma_r$ can be computed in polynomial time. The statement that the determination is NP-hard, even if the structuredness threshold θ and the maximum amount of implicit sorts k are fixed shows that there exists a (fixed) rule $r_0$. The proof of this part relies on a reduction from the graph 3-coloring problem to the determination of the existence of the sort for rule $r_0$ with θ=1 and k=3. In this reduction, a graph G (the input to the 3-coloring problem) is used to construct an RDF graph $D_G$ in such a way that a partition of the nodes of G can be represented by an entity preserving partitioning of the corresponding RDF graph. Although the rule $r_0$ is not shown explicitly here, it is designed to calculate the probability that 2 subjects in a subset of the entity preserving partitioning of $D_G$ represent 2 nodes of G which are not adjacent in G. This probability will be 1 only when the subset represents an independent set of G. Therefore, setting the threshold θ=1 ensures that each subset of $D_G$ will represent an independent set of G. Finally, setting k=3 ensures that at most 3 subsets will be generated. If the graph G is 3-colorable, then it will be possible to generate the sort refinement of $D_G$ in which each subset represents an (an independent set) of G, and thus will have a structuredness value of 1. Conversely, if there is a sort refinement of at most 3 subsets, then it is possible to partition the nodes of G into 3 or less independent sets, and thus, is 3-colorable.

It is noted that the fixed rule $r_0$ used in the reduction does not contain statements of the form subj(c)=a (where a is a constant URI), although it does use statements of the form prop(c)=a and other equalities. It is natural to exclude rules which mention specific subjects, as the structuredness of an RDF graph should not depend on the presence of a particular subject, but rather on the general uniformity of all entities in the RDF graph.

The decision problem that is presented is theoretically intractable, which immediately reduces the prospects of finding reasonable algorithms for its solution. The inclusion of the problem in NP points us to three NP-complete problems for which much work has been done to produce efficient solvers: the travelling salesman problem, the boolean satisfiability problem, and the integer linear programming problem.

A suitable algorithm is chosen as a subset for each signature, producing a series of decisions which could in principle be expressed as boolean variables, suggesting the boolean satisfiability problem. However, for a candidate sort refinement the function $\sigma_r$ is computed for every subset, requiring non-trivial arithmetics that cannot be naturally formulated as a boolean formula. Instead, the previous decision problem is expressed in a natural way as an instance of Integer Linear Programming (ILP).

In order to express as an ILP instance that, given a fixed rule r, solves the problem of determining if there exists a sort refinement for that rule. Given a dataset such as an RDF graph D, a rational number θ such that 0≤θ≤1 and a positive integer k, an instance of integer linear programming is defined that is represented as a pair $(A_{(D,k,\theta)}, \vec{b}_{(D,k,\theta)})$, where $A_{(D,k,\theta)}$ is a matrix of integer values, $\vec{b}_{(D,k,\theta)}$ is a vector of integer values, and the problem is to find a vector $\vec{d}$ of integer values, i.e., the values assigned to the variables of the system of equations, such that $A_{(D,k,\theta)} \vec{d} \leq \vec{b}_{(D,k,\theta)}$. Moreover, (D, k, θ)∈EXISTSSORTREFINEMENT(r) if and only if the instance $(A_{(D,k,\theta)}, \vec{b}_{(D,k,\theta)})$ has a solution.

Intuitively, the ILP instance works in the following way: the integer variables will decide which signatures are to be included in which subsets, and they will keep track of which properties are used in each subset. Also, variable assignments are grouped into objects called rough variable assignments, which instead of assigning each variable to a subject and a property will assign each variable to a signature and a property. In this way, another set of variables will keep track of which rough assignments are valid in a given subset, i.e., the rough assignment mentions only signatures and properties which are present in the subset. The total and favorable cases of the rule for each subset are counted. A rule r=$\phi_1 \mapsto \phi_2$ is fixed, and it is assumed that var($\phi_1$)={$c_1$, ..., $c_n$}, recalling that var($\phi_2$)⊆var($\phi_1$). Also, rational number θ∈[0,1], a positive integer k, and an RDF graph D are fixed with the matrix M=M(D).

The variables of the ILP instance are defined, recalling that the goal when solving EXISTSSORTREFINEMENT(r) is to find a $\sigma_r$-sort refinement of D with threshold θ that contains at most k implicit sorts.

All the variables used in the ILP instance take integer values. First, the set of signatures of D is defined as Λ(D)={sig(s,D)|s∈S(D)}, and for every μ∈Λ(D), the support of μ, denoted by supp(μ), is defined as the set {p∈P(D)|μ(p)=1}. Then for each i∈{1, ..., k} and each μ∈Λ(D), the following variable is defined:

$$X_{i,\mu} = \begin{cases} 1 & \text{if signature } \mu \text{ is placed in implicit sort } i \\ 0 & \text{otherwise} \end{cases}$$

These are the primary variables of the ILP instance, as they encode the sort refinement that is generated. Notice that it could be the case that for some i∈{1, ..., k} value 0 is assigned to every variable $X_{i,\mu}$(μ∈Λ(D)), in which case we have that the i-th implicit sort is empty.

For each i∈{1, ..., k} and each p∈P(D), the following variable is defined:

$$U_{i,p} = \begin{cases} 1 & \text{if implicit sort } i \text{ uses property } p \\ 0 & \text{otherwise} \end{cases}$$

Each variable $U_{i,p}$ is used to indicate whether the i-th implicit sort uses property p, that is, if implicit sort i includes a signature μ∈Λ(D) such that μ(p)=1 (p∈supp(μ)).

For the last set of variables, a rough assignment of variables in φ is considered to be a mapping of each variable to a signature and a property. Rough assignments are denoted with τ=(($\mu_1$, $p_1$), ..., ($\mu_n$, $p_n$))∈(Λ(D)×P(D))$^n$. Then for each i∈{1, ..., k} and each τ∈(Λ(D)×P(D))$^n$, the following variable is defined:

$$T_{i,\tau} = \begin{cases} 1 & \text{if is consistent in the } i\text{-th implicit sort} \\ 0 & \text{otherwis} \end{cases}$$

The rough assignment $\tau=((\mu_1, p_1), \ldots, (\mu_n, p_n))$ is consistent in the i-th implicit sort if it only mentions signatures and properties that are present in it, that is, if for each $j \in \{1, \ldots, n\}$, $\mu_j$ is included in the i-th implicit sort and said implicit sort uses $p_j$.

Regarding constraint definitions, the function count($\phi$, $\tau$, M) is defined to be the number of variable assignments for rule r that are restricted by the rough assignment and which satisfy the formula $\phi$. Formally, if $\sigma=((\mu_1, p_1), \ldots, (\mu_n, p_n))$, then count($\phi$, $\tau$, M) is defined as the cardinality of the following set:

$$\left\{ \rho \mid \begin{array}{l} \rho \text{ is a variable assignment for } D \text{ s.t. } dom(\rho) = var(\varphi), (M, \rho) \vDash \varphi \\ \text{and for every } i \in \{1, \ldots, n\}, \text{if } \rho(c_i) = \\ (s, p) \text{then sig}(s, D) = \mu_i \text{ and } p = p_i \end{array} \right\}$$

It is noted that the value of count($\phi$, $\tau$, M) is calculated offline and is used as a constant in the ILP instance. A set of inequalities that constrain the acceptable values of the previously defined variables are then determined. Several inequalities are defined that specify the obvious lower and upper bounds of all variables. These inequalities are $0 \leq X_{i,\mu} \leq 1 i \in \{1, \ldots, k\}$ and $\mu \in \Lambda(D)$; $0 \leq U_{i,p} \leq 1 i \in \{1, \ldots, k\}$ and $p \in P(D)$ and $0 \leq T_{i,\tau} \leq 1 i \in \{1, \ldots, k\}$ and $\tau \in (\Lambda(D) \times P(D))^n$. In addition, for every $\mu \in \Lambda(D)$, the following equation is used to indicate that the signature $\mu$ is assigned to exactly one implicit sort: $\Sigma_{i=1}^{k} X_{i,\mu}=1$. For every $i \in \{1, \ldots, k\}$ and $p \in P(D)$, the following equations are defined to ensure that $U_{i,p}$ is assigned to 1 if and only if the i-th implicit sort includes a signature $\mu \in \Lambda(D)$ such that $\mu(p)=1$ ($p \in \text{supp}(\mu)$):

$$X_{i,\mu} \leq U_{i,p} \text{ if } p \in \text{supp}(\mu)$$

$$U_{i,p} \leq \Sigma_{\mu' \in \Lambda(D): p \in \text{supp}(\mu')} X_{i,\mu'}$$

The first equation indicates that if signature $\mu$ has been assigned to the i-th implicit sort and $p \in \text{supp}(\mu)$, then p is one of the properties that is considered when computing $\sigma_r$ in this implicit sort. The second equation indicates that if p is used in the computation of $\sigma_r$ in the i-th implicit sort, then this implicit sort must include a signature $\mu' \in \Lambda(D)$ such that $p \in \text{supp}(\mu')$.

For $i \in \{1, \ldots, k\}$, and $\tau=((\mu_1, p_1), \ldots, (\mu_n, p_n)) \in (\Lambda(D) \times P(D))^n$, $T_{i,\tau}=1$ if and only if for every $j \in \{1, \ldots, n\}$, it holds that $X_{i,\mu_j}=1$ and $U_{i,p_j}=1$. This is expressed as integer linear equations as follows:

$$\Sigma_{j=1}^{n}(X_{i,\mu_j}+U_{i,p_j}) \leq T_{i,\tau}+2 \cdot n-1$$

$$2 \cdot n \cdot T_{i,\tau} \leq \Sigma_{j=1}^{n}(X_{i,\mu_j}+U_{i,p_j})$$

The first equation indicates that if the signatures $\mu_1, \ldots, \mu_n$ are all included in the i-th implicit sort (each variable $X_{i,\mu_j}$ is assigned value 1), and said implicit sort uses the properties $p_1, \ldots, p_n$ (each variable $U_{i,p_j}$ is assigned value 1), then $\tau$ is a valid combination when computing favorable and total cases (variable $T_{i,\tau}$ has to be assigned value 1). If any of the variables $X_{1,\mu_1}, U_{1,p_1}, \ldots, X_{i,\mu_j}, U_{i,p_j}$ is assigned value 0 in the first equation, then $\Sigma_{j=1}^{n}(X_{i,\mu_j}+U_{i,p_j}) \leq 2 \cdot n-1$ and, therefore, no restriction is imposed on $T_{i,\tau}$ by this equation, as $0 \leq T_{i,\tau}$. The second equation indicates that if variable $T_{i,\tau}$ is assigned value 1, meaning that $\tau$ is considered to be a valid combination when computing $\sigma_r$ over the i-th implicit sort, then each signature mentioned in $\tau$ must be included in this implicit sort (each variable $X_{i,\mu_j}$ has to be assigned value 1), and each property mentioned in $\tau$ is used in this implicit sort (each variable $U_{i,p_j}$ has to be assigned value 1).

Finally, assuming that $\theta=\theta_1/\theta_2$, where $\theta_1$, $\theta_2$ are natural numbers, the following equation is included for each $i \in \{1, \ldots, k\}$:

$$\theta_2 \cdot \left( \sum_{\tau \in (\Lambda(D) \times P(D))^n} \text{count}(\varphi_1 \wedge \varphi_2, \tau, M) \cdot T_{i,\tau} \right) \geq$$
$$\theta_1 \cdot \left( \sum_{\tau \in (\Lambda(D) \times P(D))^n} \text{count}(\varphi_1, \tau, M) \cdot T_{i,\tau} \right)$$

To compute the numbers of favorable and total cases for $\sigma_r$ over the i-th implicit sort, each rough assignment $\tau$ is considered in turn. The term $(\Sigma_{\tau \in (\Lambda(D) \times P(D))^n} \text{count}(\phi_1 \wedge \phi_2, \tau, M) \cdot T_{i,\tau})$ evaluates to the amount of favorable cases (i.e. variable assignments which satisfy the antecedent and the consequent of the rule), while the term $\Sigma_{\tau \in (\Lambda(D) \times P(D))^n} \text{count}(\phi_1, \tau, M) \cdot T_{i,\tau}$ evaluates to the number of total cases (i.e. variable assignments which satisfy the antecedent of the rule). Considering the former term as an example, for each rough variable assignment $\tau$, if $\tau$ is a valid combination in the i-th implicit sort, then the amount of variable assignments which are compatible with $\tau$ and which satisfy the full rule are added. From the definition of the ILP instance, the following result holds. There exists a $\sigma_r$-sort refinement of D with threshold $\theta$ that contains at most k implicit sorts if and only if the instance of ILP defined in this section has a solution.

Although the previously defined constraints are enough to solve the decision problem, in practice the search space is too large to be manageable because of the presence of sets of solutions which are equivalent, in the sense that the variables describe the same partitioning of the input RDF graph D. More precisely, if there is a solution of the ILP instance where for each $i \in \{1, \ldots, k\}$, $\mu \in \Lambda(D)$, $p \in P(D)$ and $\tau \in (\Lambda(D) \times P(D))^n$, $X_{i,\mu}=a_{i,\mu}$, $U_{i,p}=b_{i,p}$, and $T_{i,\tau}=c_{i,\tau}$, then for any permutation $(l_1, \ldots, l_k)$ of $(1, \ldots, k)$, the following is also a solution: $X_{i,\mu}=a_{l_i,\mu}$, $U_{i,p}=b_{l_i,p}$, and $T_{i,\tau}=c_{l_i,\tau}$.

In order to break the symmetry between these equivalent solutions, the following hash function is defined for the i-th implicit sort. Considering $l=|\Lambda(D)|$ and any (fixed) ordering $\mu_1, \ldots, \mu_l$ of the signatures in $\Lambda(D)$. Then hash(i)= $\Sigma_{j=0}^{l} 2^j X_{i,\mu_j}$.

With the previous hash function defined, the following constraint is added, for $i=1, \ldots, k-1$: hash(i) $\leq$ hash(i+1). The hash function as defined above uniquely identifies a subset of signatures, and, therefore, the previous constraints eliminate the presence of multiple solutions due to permutations of the i index. Care is taken, however, if the amount of signatures in the RDF graph is large (64 in the case of DBpedia Persons) as large exponent values will cause numerical instability in commercial ILP solvers. This issue may be addressed on a case by case basis. One alternative is to limit the maximum exponent in the term $2^j$, which has the drawback of increasing the amount of collisions of the hash function, and therefore permitting the existence of more equivalent solutions.

An example of the method of the present invention was urn using two real datasets: DBpedia Persons and WordNet Nouns. With each dataset, two settings were considered. The first is a highest $\theta$ sort refinement for k=2. This setup can be used to obtain an intuitive understanding of the dataset at hand. To force at most 2 implicit sorts, k is fixed to k=2. The second is a lowest k sort refinement for θ=0.9. As a complementary approach, the threshold θ=0.9 is specified, and a search is conducted for the lowest k such that a sort refinement with threshold θ and k implicit sorts exists. This approach allows a user to refine their current sort by discovering sub-sorts.

In some cases the structuredness of the original dataset under some structuredness function is higher than 0.9, in which case the threshold is increased to a higher value. In the first case the search for the optimum value of θ is done in the following way. Starting from the initial structuredness value θ=$\sigma_r$(D) for which a solution is guaranteed and for values of θ incremented in steps of 0.01, an ILP instance is generated with k=2 and the current value of θ. If a solution is found by the ILP solver, then said solution is stored. If the ILP instance is found to be infeasible, then the last stored solution is used. This is the solution with the highest threshold. This sequential search is preferred over a binary search because the latter will generate more infeasible ILP instances on average, and it has proven to be much slower to find an instance infeasible than to find a solution to a feasible instance. A similar strategy is used for the second case (the search for the lowest k), with the following difference. For some setups it is more efficient to search downwards, starting from k=|Λ(D)|, i.e., as many available sorts as signatures in the dataset. For others it is preferable to search upwards starting from k=1, thus dealing with a series of infeasible ILP instances, before discovering the first value of k such that a solution is found. Which of the two directions is to be used has been decided on a case by case basis.

The amount of variables and constraints in each ILP instance depends on the amount of variables of the rules, on the degrees of freedom given to the variables in the rules, e.g., the two variables in $\sigma_{Dep}[p_1, p_2]$ lose a degree of freedom when considering the restriction subj($c_1$)=subj($c_2$) in the antecedent, and on the characteristics of the dataset. Here, the enormous reduction in size offered by the signature representation of a dataset has proven crucial for the efficiency of solving the ILP instances. The previous two settings are applied both to the DBpedia Persons and Word-Net Nouns datasets. Furthermore, they are repeated for the structuredness functions $\sigma_{Cov}$, $\sigma_{Sim}$, and $\sigma_{Dep}$. The last function was only used on DBpedia Persons.

DBpedia corresponds to RDF data extracted from Wikipedia. DBpedia Persons refers to the following subgraph: $D_{DBpedia\ Persons}$={(s, p, o)∈DDBpedia|(s, type, Person) ∈DDBpedia}. This dataset is 534 MB in size, and contains 4,504,173 triples, 790,703 subjects, and 8 properties, excluding the type property. It consists of 64 signatures, requiring only 3 KB of storage. The list of properties is as follows: deathPlace, birthPlace, description, name, death-Date, birthDate, givenName, and surname. It is noted that these names are abbreviated versions of the full URIs.

For this sort, $\sigma_{Cov}$=0.54 and $\sigma_{Sim}$=0.77. The dependency functions are studied for different properties $p_1$ and $p_2$. If $p_1$=deathPlace and $p_2$=deathDate, for example, then the value of the function $\sigma_{SymDep}$ [deathPlace, deathDate] is 0:39. This specific choice of $p_1$ and $p_2$ is especially interesting because it might be temping to predict that a death date and a death place are equally obtainable for a person. However, the value 0.39 reveals the contrary. The generally low values for the three structuredness functions discussed make DBpedia Persons interesting to study.

Regarding a highest θ sort refinement for k=2, k is set to k=2 in order to find a two-sort sort refinement with the best threshold θ. For the $\sigma_{Cov}$ function, the left sort, which is also the largest (having 528,593 subjects), has a very clear characteristic—no subject has a deathDate or a deathPlace, i.e. it represents the sort for people that are alive. It is noted that without encoding any explicit schema semantics in the generic rule of $\sigma_{Cov}$, the ILP formulation is able to discover a very intuitive decomposition of the initial sort. Next, it is shown that this is the case even considering larger values of k. In this experimental setup, each ILP instanced is solved in under 800 ms.

For the $\sigma_{Sim}$ function, the second sort accumulates subjects for which very little data is known (other than a person's name). Whereas Cov has excluded the columns deathPlace, description, and deathDate from its first sort, Sim does not for its second sort, since it does not penalize the largely missing properties in these columns (which was what motivated the introduction of the $\sigma_{Sim}$ function in the first place. Also, unlike the $\sigma_{Cov}$ function, the cardinality of the generic sorts from $\sigma_{Sim}$ is more balanced. In this experimental setup each ILP instance is solved in under 2 minutes, except the infeasible instance (the last instance to be solved), which was completed in 2 hrs.

For $\sigma_{SymDep}$[deathPlace, deathDate], a structuredness function in which the probability that, if a subject has a deathPlace or a deathDate, it has both is measured. In the resulting sort refinement, the second sort to the right has a high value of 0.82. The ILP solution of the present invention does the right thing. In the sort, the deathDate and death-Place columns look almost identical which implies that indeed whenever a subject has one property it also has the other. As far as the other sort is concerned, this includes all subjects that do not have a deathPlace column. This causes the sort to have a structuredness value of 1.0 for $\sigma_{SymDep}$ [deathPlace, deathDate], since the rule is trivially satisfied. This is because the absence of the column eliminates all total cases. i.e., there are no assignments of variables in the rule that represents $\sigma_{SymDep}$[deathPlace, deathDate] for which the antecedent is true, because it is never true that prop($c_1$)=deathPlace. This setting is completed in under 1 minute.

Regarding a lowest k sort refinement for a fixed threshold θ=0.9, the smallest sort refinement for DBpedia persons with this threshold is sought. For $\sigma_{Cov}$, where the optimum value found is for k=9, the Cov function shows a clear tendency to produce sorts which do not use all the columns (i.e. sorts which exclude certain properties). People that are alive can now be found in the first, second, third, fourth, and sixth sorts. The first sort considers living people who have a description (and not even a birth place or date). The second sort shows living people who are even missing the description field. The third sort considers living people who have a description and a birth date or a birth place (or both). The fourth sort considers living people with a birth place or birth date but no description. Finally, the sixth sort considers living people with a birth place only. It is easy to see that similarly dead people are separated into different sorts, based on the properties that are known for them. The eighth sort is particularly interesting since it contains people for which we mostly have all the properties. This setup was completed in a total of 30 minutes.

For $\sigma_{Sim}$, where the optimum value found is for k=4, the function is more lenient when properties appear for only a small amount of subjects (hence the smaller k). This is clearly evident in the first sort for this function, which corresponds roughly to the second sort generated for the $\sigma_{Cov}$ func-birth/death places/dates. This is also verified by the relative sizes of the two sorts, with the sort for $\sigma_{Cov}$ having 260,585 subjects, while the sort for $\sigma_{Sim}$ having 292,880 subjects. This experimental setup is clearly more difficult as the running time of individual ILP instances is approximately 8 hours.

Regarding the dependency functions, to create a new sort refinement using the function $\sigma_{Dep}[p_1, p_2]$, for any constants $p_1, p_2 \in U$, a sort refinement is generated with $\theta=1.0$ for k=2, containing the following two sorts: all entities which do not have $p_1$ and all entities that do have $p_2$. The first sort has structuredness 1.0, because there are no assignments that satisfy the antecedent (no assignments satisfy prop($c_2$)=$p_1$), and the second sort has structuredness 1.0 because every assignment that satisfies the antecedent will also satisfy the consequent (val($c_2$)=1 because all entities have $p_2$). On the other hand, $\sigma_{SymDep}$ with constants $p_1, p_2 \in U$ a sort refinement is generated with $\theta=1.0$ for $\theta=1.0$, containing the following three sorts: entities which have $p_1$ but not $p_2$, entities which have $p_2$ but not $p_1$, and entities which have both $p_1$ and $p_2$ or have neither. The first two sorts will not have any total cases, and for the third sort every total case is also a favorable case.

The dependency functions, as shown, are not very well suited to the task of finding the lowest k such that the threshold $\theta$ is met, which is why these functions were not included in the previous results. The dependency functions are useful, however, for characterizing an RDF graph or a sort refinement which was generated with a different structuredness function, such as $\sigma_{Cov}$ or $\sigma_{Sim}$, since they can help analyze the relationship between the properties in an RDF graph. As illustrated in Table 1, for the $\sigma_{Dep}[p_1, p_2]$ function, the structuredness value of DBpedia Persons is tabulated when replacing the parameters $p_1$ and $p_2$ by all possible combinations of deathPlace, birthPlace, deathDate, and birthdate, while recalling that $\sigma_{Dep}$ with parameters $p_1$=deathPlace and $p_2$=birthPlace measures the probability that a subject which has deathPlace also has birthPlace.

TABLE 1

DBpedia Persons structuredness according to $\sigma_{Dep}$ with different combinations of parameters $p_1$ and $p_2$. The property names are abbreviated in the column headers.

|  | dP | bP | dD | bD |
| --- | --- | --- | --- | --- |
| deathPlace | 1.0 | 0.93 | 0.82 | 0.77 |
| Birthplace | 0.26 | 1.0 | 0.27 | 0.75 |
| deathDate | 0.43 | 0.50 | 1.0 | 0.89 |
| Birthdate | 0.17 | 0.57 | 0.37 | 1.0 |

TABLE 2

A ranking of DBpedia Persons structuredness according to $\sigma_{ymDep}$ with different combinations of the 8 properties in P (DBpedia Persons). Only the highest and lowest entries are shown.

| $p_1$ | $p_2$ | $\sigma_{ymDep}$ |
| --- | --- | --- |
| givenName | surname | 1.0 |
| name | givenName | 0.95 |
| name | surname | 0.95 |
| name | birthdate | 0.53 |
| ... | ... | ... |
| description | givenName | 0.14 |
| deathPlace | name | 0.11 |
| deathPlace | givenName | 0.11 |
| deathPlace | surname | 0.11 |

Table 1 reveals various aspects of the dataset. For example, the first row shows high structuredness values when $p_1$=deathPlace. This implies that if the deathPlace is known for a particular person, there is a very high probability that all the other properties are known for that person. Therefore, knowing the death place of a person implies that a lot is known about that person. This is also an indication that it is somehow the hardest fact to acquire, or the fact that is least known among persons in DBpedia. It is noticed that none of the other rows have a similar characteristic. For example, in the second row it is shown that given the birthPlace of a person, there is a small chance (0.27) that the deathDate is known for that person. Similarly, given the deathDate of a person there is only a small chance (0.43) that we know the deathPlace for that person.

A similar analysis is conducted with the $\sigma_{SymDep}[p_1, p_2]$ function. Referring to Table 2, the pairs of properties with the highest and lowest values of $\sigma_{SymDep}$ are illustrated. Given that the name property in DBpedia persons is the only property that every subject has, it is expected that the most correlated pair of properties would include name. Surprisingly, this is not the case. Properties givenName and surName are actually the most correlated properties, probably stemming from the fact that these to properties are extracted from the same source. The least correlated properties all involve deathPlace and the properties of name, givenName and surName, respectively.

Regarding WordNet Nouns, WordNet is a lexical database for the English language. WordNet Nouns refers to the following subgraph:

$$D_{WordNet\ Nouns} = \{(s,p,o) \in D_{WordNet} | (s,\text{type},\text{Noun}) \in D_{wordN}\}$$

This dataset is 101 MB in size, and contains 416,338 triples, 79,689 subjects, and 12 properties (excluding the type property). Its signature representation includes 53 signatures, stored in 3 KB. The list of properties is the following: gloss, label, synsetId, hyponymOf, classifiedByTopic, containsWordSense, memberMeronymOf, partMeronymOf, substanceMeronymOf, classifiedByUsage, classifiedByRegion, and attribute. For this sort, $\sigma_{Cov}$=0.44 and $\sigma_{Sim}$=0.93. There is a significant difference in the structuredness of WordNet Nouns as measured by the two functions. This difference is clearly visible in the signature view of this dataset. The presence of nearly empty properties (i.e. properties which relatively few subjects have) is highly penalized by the Cov rule, though mostly ignored by the Sim rule.

Regarding a highest $\theta$ sort refinement for k=2, the WordNet case proves to be very different from DBpedia Persons partly because in this dataset there are roughly 5 dominant signatures which represent a large portion of the subjects, and yet only use 8 of the 12 properties. This causes difficulties when partitioning the dataset into 2 sorts. The most notable difference between both sorts is that the one sort mostly contains subjects that have the memberMeronymOf property (the seventh property). The improvement in the structuredness of these two sorts is very small in comparison to the original dataset (from 0.44 to 0.55), suggesting that k=2 is not enough to discriminate sub-sorts in this dataset, and with this rule. This is mostly due to the presence of many of signatures which represent very few subjects, and have different sets of properties. For this setup, all ILP instances were solved in under 1 second. For $\sigma_{Sim}$, the clear difference between the two sorts is gloss, which is absent in the other sort. The placement of the smaller signatures does not seem to follow any pattern, since the Sim function is not sensitive to their presence. Although the structuredness is high for this partitioning, the improvement is not large, since the original dataset is highly structured with respect to $\sigma_{Sim}$ anyway. A discussion is in order with respect to the running times of this experiment. Recall that the ILP instances are solved for increasing values of θ (the increment being 0.01). For all values of θ lower than 0.95 each ILP instance is solved in less than 5 seconds. For the value θ=0.95 however (the first value for which there is no solution), after 75 hours of running time, the ILP solver was not able to find a solution or prove the system infeasible. Although there is an enormous asymmetry between the ease of finding a solution and the difficulty of proving an instance infeasible, in every instance a higher threshold solution is found, in which case it is reasonable to let the user specify a maximum running time and keep the best solution found up to that moment.

For a lowest k sort refinement for fixed θ, WordNet Nouns proves more difficult to solve. For the $\sigma_{Cov}$, the usual threshold of 0.9 is set. However, since the structuredness value of Wordnet Nouns under the $\sigma_{Sim}$ function is 0.93 originally, this exercise would be trivial if the threshold is 0.9. For that reason, in this last case the threshold is fixed at 0.98.

Regarding sorts for k=31 solution for $\sigma_{Cov}$, the sheer amount of sorts needed is an indication that Word-Net Nouns already represents a highly structured sort. The sorts in many cases correspond to individual signatures, which are the smallest sets of identically structured entities. In general, it is probably not of interest for a user or database administrator to be presented with a sort refinement with so many sorts. This setup was the longest running, at an average 7 hours running time per ILP instance. This large number is another indication of the difficulty of partitioning a dataset with highly uniform entities. Regarding the solution for $\sigma_{Sim}$, which is for k=4, there is a sort that does not include the gloss property. The general pattern of this sort refinement, however, is that the four largest signatures are each placed in their own sort. Beyond that, the presence of the smaller signatures does not greatly affect the structuredness value. This setup was completed in approximately 15 minutes. It is to be expected that a highly structured RDF graph like Word-Net Nouns will not be a prime candidate for discovering refinements of the sort, which is confirmed by these experiments.

Figure 2:
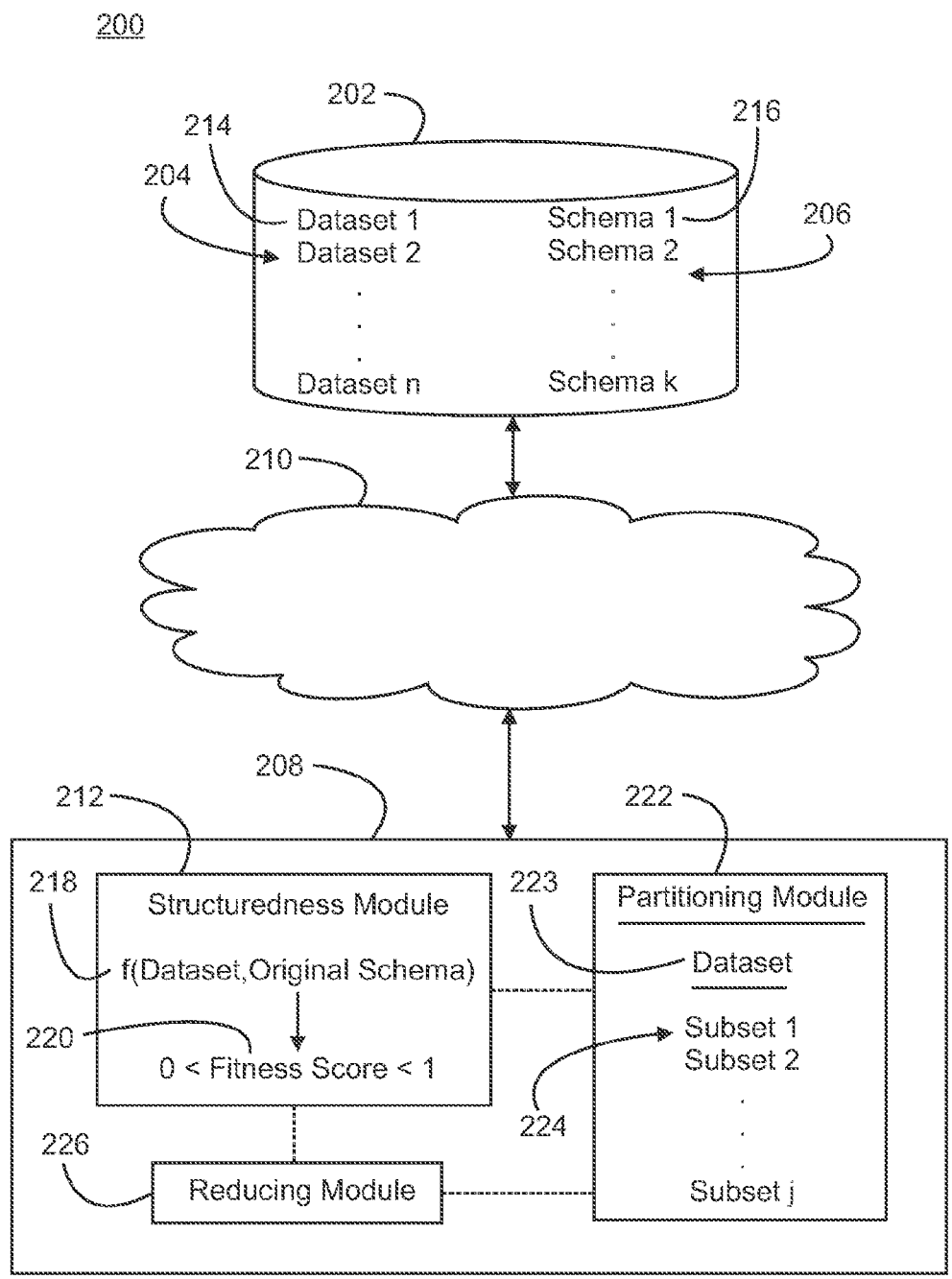
FIG. 2 is a schematic illustration of an embodiment of a system for method for determining a schema for a dataset in accordance with the present invention.

Referring now to FIG. 2, a system for determining a schema for a dataset 200 in accordance with the present invention is illustrated. The system includes at least one database 202. The database includes at least one and alternatively a plurality of datasets 204. Each dataset includes data and relationships between data pairs. In one embodiment, each dataset is a graph dataset. Alternatively, each dataset is a resource description framework (RDF) dataset containing a plurality of subjects and a plurality of objects that are the dataset data. The RDF dataset also includes a plurality of predicates containing the dataset relationships and expressing the relationships between subject and object pairs. The database also includes a plurality of schemas 206 for the dataset. Each schema represents an organizational structure for a given dataset.

The system 200 also includes a computing system 208 in communication with the database across one or more networks 210 including local area networks and wide area networks. Suitable computing systems include a central processing unit that executes programs or computer code to perform the functionalities of the systems and methods of the present invention. This computer code includes a structuredness module 212 within the computing system that is used to determine an initial fit between a given dataset 214 and an original schema 216 selected from the plurality of schemas. This initial fit quantifies a conformity of the data in the dataset to the organizational structure of the original schema.

In one embodiment, the structuredness module includes a structuredness function 218 that uses the dataset and the original schema as inputs to generate a fitness score 220 expressing the initial fit. In one embodiment, the fitness score, i.e., the initial fit, is a rational value between zero and one. In one embodiment, the data in the dataset includes subjects and properties associated with the subjects, and the structuredness function is a coverage structuredness function that generates the fitness score to express an extent to which if one subject has a given associated property then all subjects have the given associated property. In another embodiment, the data in the dataset contain subjects and properties associated with the subjects, and the structuredness function is a similarity structuredness function that generates a fitness score to express a probability that if a first subject has a given associated property then a second subject has the given associated property. In yet another embodiment, the data in the dataset include subjects and properties associated with the subjects, and the structuredness function is a dependency structuredness function that generates a fitness score to express an extent to which if one subject has a first associated property then that one subject also has a second associated property.

The executable computer code within the computing system also includes a partitioning module 222 to partition the selected dataset 223 into a plurality of subsets 224. Each subset has a modified fit that quantifies a modified conformity of subset data in each subset to one of the plurality of schemas in the database including the original schema and any additional schemas. This modified fit is greater than the original fit. The subsets are preferably defined such that the intersection of the plurality of subsets is an empty set and the union of the plurality of subsets is the dataset. In one embodiment, the structuredness function in the structuredness module generates a fitness score for the modified fit of a subset, and the partitioning module determines a smallest number of subsets in the plurality of subsets such that each subset has a fitness score greater than a threshold value. Alternatively, the partitioning module selects the plurality of subsets having a pre-determined number of subsets such that a minimum fitness score across all subsets in the plurality of subsets is a maximum fitness score among all potential groupings of subsets of the dataset containing the pre-determined number of subsets.

In one embodiment, the computer executable code in the computing system provides for a reducing module 226 to reduces the size of the selected dataset. The partitioning module partitions the dataset having the reduced size. In one embodiment, the partitioning module uses an instance of integer linear programming to identify subsets in the plurality of subsets that satisfy a given structuredness function from the structuredness module.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for determining a schema for a dataset in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for determining a schema for a dataset, the method comprising:
   identifying a dataset comprising data in a given format and relationships between data pairs;
   identifying an original schema for the dataset, the original schema comprising comprising describing an organizational structure;
   determining an initial fit between the dataset and the original schema, the initial fit quantifying a conformity of the data in the given format in the dataset to the organizational structure of the original schema;
   identifying a plurality of additional schemas, each additional schema describing a distinct organizational structure; and
   partitioning the data in the dataset into a plurality of subsets, each subset comprising at least a portion of the data maintained in the given format and a modified fit quantifying a modified conformity of subset data in each subset to one of the original schema and the additional schemas, the modified fit greater than the original fit.

2. The method of claim 1, wherein the dataset comprises a graph dataset.

3. The method of claim 1, wherein the dataset comprises a resource description framework dataset comprising:
   a plurality of subjects and a plurality of objects comprising the dataset data; and
   a plurality of predicates comprising the dataset relationships and expressing the relationships between subject and object pairs.

4. The method of claim 1, wherein determining the initial fit comprises:
   defining a structuredness function that generates a fitness score; inputting the dataset and the original schema into the structuredness function; and
   generating the fitness score expressing the initial fit.

5. The method of claim 4, wherein the fitness score comprises a rational value between zero and one.

6. The method of claim 4, wherein:
   the data in the dataset comprise subjects and properties associated with the subjects; and defining the structuredness function further comprises defining the structuredness function to evaluate a dataset structure where if one subject has a given associated property then all subjects have the given associated property and to generate the fitness score to express an extent to which data in the dataset conform to the dataset structure.

7. The method of claim 4, wherein:
   the data in the dataset comprise subjects and properties associated with the subjects; and defining the structuredness function further comprises defining the structuredness function to evaluate a data structure where if a first subject has a given associated property then a second subject has the given associated property and to generate the fitness score to express a probability that data in the dataset conform to the dataset structure.

8. The method of claim 4, wherein:
   the data in the dataset comprise subjects and properties associated with the subjects; and
   defining the structuredness function further comprises defining the structuredness function to evaluate a dataset structure where if one subject has a first associated property then the one subject also has a second associated property and to generate the fitness score to express an extent to which data in the dataset conform to the dataset structure.

9. The method of claim 4, wherein:
   the data in the dataset comprise subjects and properties associated with the subjects; and
   defining the structuredness function further comprises:
      expressing the dataset as a matrix comprising a plurality of cells and a plurality of indices, each index corresponding to a given subject or a given property in the dataset;

defining a language comprising variables pointing to cells in the matrix and formulas representing the indices and cell values associated with each variable; and using the language to construct statements comprising contents of the cells, the indices and at least one of conjunctions, disjunctions and negations.

10. The method of claim 1, wherein the intersection of the plurality of subsets is an empty set and the union of the plurality of subsets is the dataset.

11. The method of claim 1, wherein partitioning the dataset into a plurality of subsets further comprises:

defining a structuredness function that generates a fitness score for the modified fit of a subset;

defining a threshold value for the fitness score; and determining a smallest number of subsets in the plurality of subsets such that each subset has a fitness score greater than the threshold value.

12. The method of claim 1, wherein partitioning the dataset into a plurality of subsets further comprises:

defining a structuredness function that generates a fitness score for the modified fit of a subset;

defining a pre-determined number of subsets to be included in the plurality of subsets; and selecting the plurality of subsets comprising the pre-determined number of subsets such that a minimum fitness score across all subsets in the plurality of subsets is a maximum fitness score among all potential groupings of subsets of the dataset comprising the pre-determined number of subsets.

13. The method claim 1, wherein partitioning the dataset into a plurality of subsets further comprises reducing the size of the dataset and partitioning the dataset having the reduced size.

14. The method of claim 1, wherein partitioning the dataset into a plurality of subsets further comprises using an instance of integer linear programming to identify subsets in the plurality of subsets that satisfy a given structuredness function.

15. A computer-readable storage medium containing a computer-readable code that when read by a computer causes the computer to perform a method for determining a schema for a dataset, the method comprising:

identifying a dataset comprising data in a given format and relationships between data pairs;

identifying an original schema for the dataset, the original schema describing an organizational structure;

determining an initial fit between the dataset and the original schema, the initial fit quantifying a conformity of the data in the given format in the dataset to the organizational structure of the original schema;

identifying a plurality of additional schemas, each additional schema describing a distinct organizational structure; and partitioning the data in the dataset into a plurality of subsets, each subset comprising at least a portion of the data maintained in the given format and a modified fit quantifying a modified conformity of subset data in each subset to one of the original schema and the additional schemas, the modified fit greater than the original fit.

16. The computer-readable medium of claim 15, wherein: the data in the dataset comprise subjects and properties associated with the subjects; and determining the initial fit comprises:

defining a structuredness function to evaluate a data structure where if a first subject has a given associated property then a second subject has the given associated property and to generate the fitness score to express a probability that data in the dataset conform to the dataset structure; inputting the dataset and the original schema into the structuredness function; and generating the fitness score expressing the initial fit.

17. The computer-readable medium of claim 15, wherein: the data in the dataset comprise subjects and properties associated with the subjects; and determining the initial fit comprises:

defining a structuredness function to evaluate a dataset structure where if one subject has a given associated property then all subjects have the given associated property and to generate the fitness score to express an extent to which data in the dataset conform to the dataset structure; inputting the dataset and the original schema into the structuredness function; and generating the fitness score expressing the initial fit.

18. The computer-readable medium of claim 15, wherein: the data in the dataset comprise subjects and properties associated with the subjects; and determining the initial fit comprises:

defining a structuredness function to evaluate a dataset structure where if one subject has a first associated property then the one subject also has a second associated property and to generate the fitness score to express an extent to which data in the dataset conform to the dataset structure; inputting the dataset and the original schema into the structuredness function; and generating the fitness score expressing the initial fit.

19. The computer-readable medium of claim 15, wherein partitioning the dataset into a plurality of subsets further comprises:

defining a structuredness function that generates a fitness score for the modified fit of a subset; defining a threshold value for the fitness score; and determining a smallest number of subsets in the plurality of subsets such that each subset has a fitness score greater than the threshold value.

20. The computer-readable medium of claim 15, wherein partitioning the dataset into a plurality of subsets further comprises:

defining a structuredness function that generates a fitness score for the modified fit of a subset;

defining a pre-determined number of subsets to be included in the plurality of subsets; and selecting the plurality of subsets comprising the pre-determined number of subsets such that a minimum fitness score across all subsets in the plurality of subsets is a maximum fitness score among all potential groupings of subsets of the dataset comprising the pre-determined number of subsets.

21. A system for determining a schema for a dataset, the system comprising:

a database comprising:

at least one dataset comprising data in a given format and relationships between data pairs; and a plurality of schemas for the for the dataset, each schema describing an organizational structure for a given dataset;

a computing system in communication with the database, the computing system comprising:

a structuredness module to determine an initial fit between the dataset and an original schema from the plurality of schemas, the initial fit quantifying a conformity of the data in the dataset to the organizational structure of the original schema; and a partitioning module to partition the dataset into a plurality of subsets, each subset comprising at least a portion of the data maintained in the given format and a modified fit quantifying a modified conformity of subset data in each subset to one of the original schema and additional schemas from the plurality of schemas, the modified fit greater than the original fit.

22. The system of claim 21, wherein each dataset comprises a graph dataset.

23. The system of claim 21, wherein each dataset comprises a resource description framework dataset comprising:
a plurality of subjects and a plurality of objects comprising the dataset data; and
a plurality of predicates comprising the dataset relationships and expressing the relationships between subject and object pairs.

24. The system of claim 21, wherein determining the structuredness module comprises a structuredness function that uses the dataset and the original schema as inputs to generate a fitness score expressing the initial fit.

25. The system of claim 24, wherein the fitness score comprises a rational value between zero and one.

26. The system of claim 24, wherein:
the data in the dataset comprise subjects and properties associated with the subjects; and the structuredness function comprises a coverage structuredness function to generate the fitness score to express an extent to which if one subject has a given associated property then all subjects have the given associated property.

27. The system of claim 24, wherein:
the data in the dataset comprise subjects and properties associated with the subjects; and the structuredness function comprises a similarity structuredness function to generate the fitness score to express a probability that if a first subject has a given associated property then a second subject has the given associated property.

28. The system of claim 24, wherein:
the data in the dataset comprise subjects and properties associated with the subjects; and the structuredness function comprises a dependency structuredness function to generate the fitness score to express an extent to which if one subject has a first associated property then the one subject also has a second associated property.

29. The system of claim 21, wherein
the intersection of the plurality of subsets is an empty set and the union of the plurality of subsets is the dataset.

30. The system of claim 21, wherein:
the structuredness module comprises a structuredness function that generates a fitness score for the modified fit of a subset; and the partitioning module determines a smallest number of subsets in the plurality of subsets such that each subset has a fitness score greater than a threshold value.

31. The system of claim 21, wherein:
the structuredness module comprises a structuredness function that generates a fitness score for the modified fit of a subset; and the partitioning module selects the plurality of subsets comprising a pre-determined number of subsets such that a minimum fitness score across all subsets in the plurality of subsets is a maximum fitness score among all potential groupings of subsets of the dataset comprising the pre-determined number of subsets.

32. The system claim 21, wherein:
the system further comprises a reducing module to reduce the size of the dataset; and the partitioning module partitions the dataset having the reduced size.

33. The system of claim 21, wherein
the partitioning module uses an instance of integer linear programming to identify subsets in the plurality of subsets that satisfy a given structuredness function from the structuredness module.

\* \* \* \* \*